(12) United States Patent
Liu et al.

(10) Patent No.: US 10,418,031 B2
(45) Date of Patent: Sep. 17, 2019

(54) VOICE REMOTE CONTROL APPARATUS AND POWER SUPPLY METHOD THEREOF

(71) Applicant: Qingdao GoerTek Technology Co., Ltd., Qingdao (CN)

(72) Inventors: Xun Liu, Qingdao (CN); Pengpeng Liu, Qingdao (CN); Zhicheng Liu, Qingdao (CN)

(73) Assignee: Qingdao Goertek Technology Co., Ltd., Qingdao (CN)

( * ) Notice: Subject to any disclaimer, the term of this patent is extended or adjusted under 35 U.S.C. 154(b) by 0 days.

(21) Appl. No.: 15/767,581

(22) PCT Filed: May 25, 2016

(86) PCT No.: PCT/CN2016/083317
§ 371 (c)(1),
(2) Date: Apr. 11, 2018

(87) PCT Pub. No.: WO2017/071193
PCT Pub. Date: May 4, 2017

(65) Prior Publication Data
US 2018/0293979 A1   Oct. 11, 2018

(30) Foreign Application Priority Data

Oct. 29, 2015 (CN) .......................... 2015 1 0717228

(51) Int. Cl.
*H04B 15/00* (2006.01)
*G10L 15/20* (2006.01)
(Continued)

(52) U.S. Cl.
CPC .............. *G10L 15/20* (2013.01); *G10L 15/22* (2013.01); *G10L 21/0224* (2013.01);
(Continued)

(58) Field of Classification Search
CPC ........... G10L 15/20; H02J 7/0068; H02J 7/32; H04N 21/422
(Continued)

(56) References Cited

U.S. PATENT DOCUMENTS

| 7,095,213 B2 | 8/2006 | Weng |
| 2006/0113961 A1 | 6/2006 | Weng |
| 2010/0056227 A1* | 3/2010 | Hayakawa .......... G10L 21/0208 455/570 |

FOREIGN PATENT DOCUMENTS

| CN | 101661753 A1 | 3/2010 |
| CN | 202353423 U * | 7/2012 |

(Continued)

*Primary Examiner* — Xu Mei
*Assistant Examiner* — Ammar T Hamid
(74) *Attorney, Agent, or Firm* — Fox Rothschild LLP; Carol E. Thorstad-Forsyth

(57) ABSTRACT

The present disclosure discloses a voice remote controller and a power supplying method thereof. The voice remote controller comprises: a noise gathering module for gathering ambient noise at the periphery of the voice remote controller by using a sound aperture array; a sound-electricity converting module for converting the ambient noise gathered by the noise gathering module into an electrical signal; and an energy storing module for storing the electrical signal converted by the sound-electricity converting module as electric energy and supplying power to the voice remote controller. According to the present disclosure, ambient noise is gathered by a sound aperture array and converted into electricity used as the working energy, thereby avoiding battery replacing or frequent charging. When a voice function of a voice remote controller is turned off, all of the gathered ambient noise is converted into electricity, thereby improving the energy utilization rate. By adjusting the number of opened sound apertures in the sound aperture array and changing the noise gathering angle, ambient noise can be separated from (Continued)

a voice signal of the user, and by inverting a noise waveform and superimposing the same onto the voice signal, ambient noise in the voice signal can be filtered out, thereby reducing the negative effects of ambient noise on the voice remote controller.

7 Claims, 2 Drawing Sheets

(51) Int. Cl.
| | |
|---|---|
| *G10L 21/0224* | (2013.01) |
| *H04N 21/422* | (2011.01) |
| *G10L 15/22* | (2006.01) |
| *G10L 21/0232* | (2013.01) |
| *G10L 25/84* | (2013.01) |
| *H02J 7/00* | (2006.01) |
| *H02J 50/00* | (2016.01) |
| *H03G 3/20* | (2006.01) |
| *H02J 50/15* | (2016.01) |
| *H04R 1/34* | (2006.01) |

(52) U.S. Cl.
CPC .......... *G10L 21/0232* (2013.01); *G10L 25/84* (2013.01); *H02J 7/0068* (2013.01); *H02J 50/00* (2016.02); *H04N 21/422* (2013.01); *H04N 21/42222* (2013.01); *H02J 50/15* (2016.02); *H02J 2007/0037* (2013.01); *H04R 1/342* (2013.01)

(58) Field of Classification Search
USPC ........................................ 381/94.7
See application file for complete search history.

(56) References Cited

FOREIGN PATENT DOCUMENTS

| CN | 202353423 U | 7/2012 |
| CN | 105357566 A | 2/2016 |
| JP | 2013106276 A | 5/2013 |

* cited by examiner

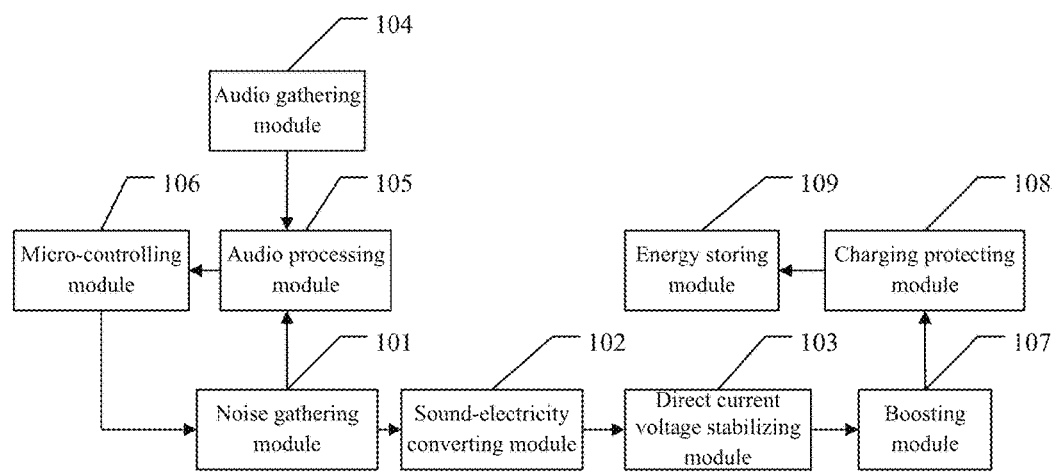
FIG. 1
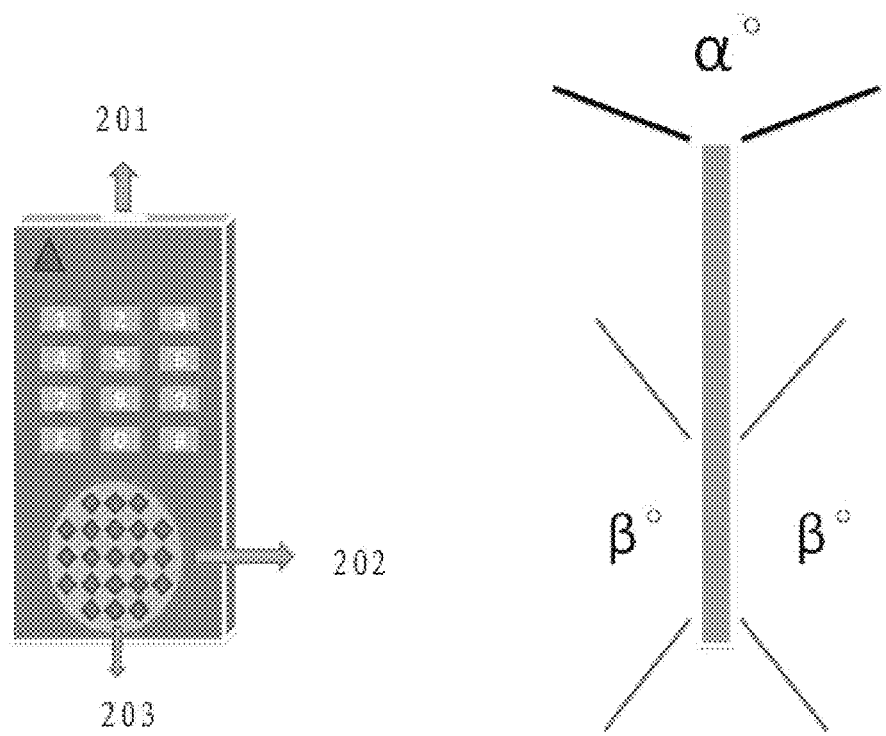
FIG. 2
FIG. 3

VOICE REMOTE CONTROL APPARATUS AND POWER SUPPLY METHOD THEREOF

RELATED APPLICATION DATA

The present application is the U.S. National Phase of International Patent Application No. PCT/CN2016/083317, filed on May 25, 2016 and entitled "VOICE REMOTE CONTROLLER AND POWER SUPPLYING METHOD THEREOF," which claims priority to Chinese Patent Application No. CN 201510717228.7, filed on Oct. 29, 2015 and entitled "VOICE REMOTE CONTROLLER AND POWER SUPPLYING METHOD THEREOF," the contents of which are incorporated herein by reference in their entireties.

TECHNICAL FIELD

The present disclosure relates to the technical field of electronic devices, and particularly relates to a voice remote controller and a power supplying method thereof.

BACKGROUND ART

As an essential component of television sets, remote controllers have been continually improved to provide better user experience as well as more functions in recent years. The remote controllers on the market mainly use the following two power supplying modes.

The first power supplying mode uses non-rechargeable batteries such as a button cell and a dry battery, and its main drawback is the wasting of resources and environment pollution caused by disposing of batteries after the electric quantity is exhausted.

The second power supplying mode uses rechargeable batteries such as a lithium battery, and its drawback is that it requires frequent electricity charging.

More and more intelligent television remote controllers are equipped with function modules such as a voice module. This kind of voice remote controller can identify general commands by the voice recognition function, and users need not look for a desired key in the press key region of the remote controller every time the television set is controlled, which facilitates its use by users; however, the power consumption of the remote controller is increased to a certain extent, and the frequency of battery replacing or electricity charging is also increased.

SUMMARY OF THE DISCLOSURE

The present disclosure provides a voice remote controller and a power supplying method thereof, to solve the problem of the conventional voice remote controllers that it is required to frequently replace the battery or frequently charge.

According to an aspect of the present disclosure, the present disclosure provides a voice remote controller, comprising:

a noise gathering module for gathering ambient noise at the periphery of the voice remote controller by using a sound aperture array;

a sound-electricity converting module for converting the ambient noise gathered by the noise gathering module into an electrical signal; and an energy storing module for storing the electrical signal obtained by the converting of the sound-electricity converting module as electric energy and supplying power to the voice remote controller;

wherein the sound aperture array is provided on a main body of the voice remote controller, each sound aperture of the sound aperture array is controlled by an electrical control switch, and a micro-controlling module of the voice remote controller controls turning on or turning off of the electrical control switch of each sound aperture to control the range within which the sound aperture array gathers the ambient noise.

Optionally, the voice remote controller further comprises:

an audio gathering module for gathering a voice signal of the user by using a microphone sound aperture when a voice function of the voice remote controller is turned on; and an audio processing module for capturing a noise waveform from the ambient noise gathered by the noise gathering module, and superimposing the noise waveform after its phase is inverted onto the voice signal gathered by the audio gathering module to filter out the ambient noise in the voice signal.

Optionally, the audio processing module further calculates sound pressure of the ambient noise gathered by the sound aperture array and sound pressure of the ambient noise contained in the voice signal gathered by the microphone sound aperture, and sends them to the micro-controlling module, when the voice function of the voice remote controller is turned on; and the micro-controlling module controls the electrical control switches of all sound apertures of the sound aperture array to open when the voice function of the voice remote controller is turned off, and controls the electrical control switches of part of the sound apertures of the sound aperture array to close according to the sound pressure of the ambient noise gathered by the sound aperture array and the sound pressure of the ambient noise contained in the voice signal gathered by the microphone sound aperture, when the voice function of the voice remote controller is turned on.

Optionally, when the voice function of the voice remote controller is turned on, the micro-controlling module enables sound pressure of an ambient noise component contained in the audio gathering angle to be lower by one order of magnitude than sound pressure of the ambient noise at the noise gathering angle by controlling the electrical control switch of each sound aperture of the sound aperture array to turn on or turn off.

Optionally, the voice remote controller further comprises:

a direct current voltage stabilizing module for converting the electrical signal obtained by the converting by the sound-electricity converting module into a direct current signal and stabilizing its voltage;

a boosting module for raising a voltage of the electrical signal outputted by the direct current voltage stabilizing module to a preset voltage value; and a charging protecting module which is provided between the boosting module and the energy storing module and for preventing overcharging of the energy storing module.

According to another aspect of the present disclosure, the present disclosure provides a power supplying method of a voice remote controller, comprising the steps of:

gathering ambient noise at the periphery of the voice remote controller by using a sound aperture array;

converting the gathered ambient noise into an electrical signal; and storing the electrical signal as electric energy and supplying power to the voice remote controller;

wherein the sound aperture array is provided on a main body of the voice remote controller, each sound aperture of the sound aperture array is controlled by an electrical control switch, and the range within which the sound aperture array gathers the ambient noise is controlled by controlling turning on or turning off of the electrical control switch of each sound aperture.

Optionally, the method further comprises the steps of:

gathering a voice signal of the user by using a microphone sound aperture when a voice function of the voice remote controller is turned on;

capturing a noise waveform from the gathered ambient noise; and superimposing the noise waveform after its phase is inverted onto the voice signal gathered by the audio gathering module to filter out the ambient noise in the voice signal.

Optionally, the method further comprises the step of:

acquiring sound pressure of the ambient noise gathered by the sound aperture array and sound pressure of the ambient noise contained in the voice signal gathered by the microphone sound aperture when the voice function of the voice remote controller is turned on; and the step of gathering ambient noise at the periphery of the voice remote controller by using a sound aperture array comprises the step of:

controlling all sound apertures of the sound aperture array to open when the voice function of the voice remote controller is turned off, controlling part of the sound apertures of the sound aperture array to close when the voice function of the voice remote controller is turned on.

Optionally, the step of controlling part of the sound apertures of the sound aperture array to close when the voice function of the voice remote controller is turned on comprises the step of:

when the voice function of the voice remote controller is turned on, enabling sound pressure of an ambient noise component contained in the audio gathering angle to be lower by one order of magnitude than sound pressure of the ambient noise at the noise gathering angle by controlling the electrical control switch of each sound aperture of the sound aperture array to turn on or turn off according to sound pressure of the ambient noise gathered by the sound aperture array and sound pressure of the ambient noise contained in the voice signal gathered by the microphone sound aperture.

Optionally, the step of storing the electrical signal as electric energy and supplying power to the voice remote controller comprises the steps of:

providing a direct current voltage stabilizing module for converting the electrical signal into a direct current signal and stabilizing its voltage, providing a boosting module for raising the voltage after the voltage stabilizing to a preset voltage value, and providing a charging protecting module for preventing overcharging of a storing module of the voice remote controller.

Compared with the prior art, the embodiments of the present disclosure have the following advantageous effects.

According to the embodiments of the present disclosure, the ambient noise at the periphery of the voice remote controller is gathered by using a sound aperture array and converted into electric energy as the working energy of the voice remote controller, thereby battery replacing or frequency charging can be avoided, which is environmentally friendly, facilitates the using, and has good applicability and application compatibility. When the voice function of the voice remote controller is turned off, all sound apertures in the sound aperture array are opened, and all of the ambient noise gathered is converted into electric energy, which greatly improves the utilization rate of energy.

In the preferable embodiments, by adjusting the number of opened sound apertures in the sound aperture array, the cavity and the noise gathering angle of the sound aperture array are changed to separate the ambient noise from the voice signal of the user, and the noise is converted and used as energy. Moreover, the noise waveform after inverted is superimposed onto the voice signal to filter out the ambient noise in the voice signal, thereby improving the sampling and transmitting of the voice signal and reducing the negative effects of the ambient noise on the voice remote controller.

BRIEF DESCRIPTION OF THE DRAWINGS

FIG. 1 is a schematic diagram of the structure of function modules of a voice remote controller in accordance with an embodiment of the present disclosure;

FIG. 2 is a front view of the appearance of a voice remote controller in accordance with an embodiment of the present disclosure;

FIG. 3 is a schematic diagram of angles of gathering ambient noise and voice signals of a voice remote controller in accordance with an embodiment of the present disclosure.

DETAILED DESCRIPTION

Figure 4:
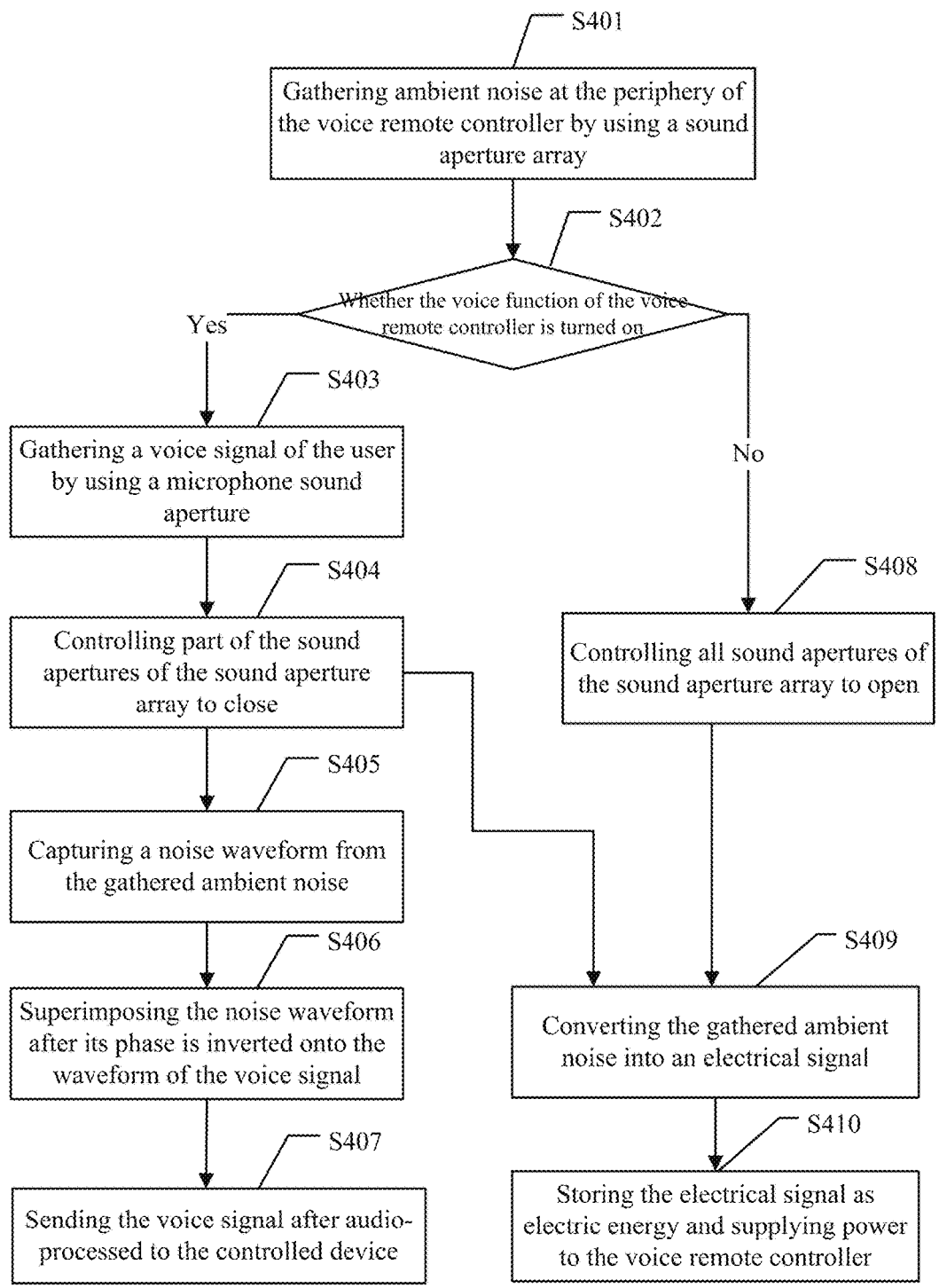
FIG. 4 is a particular flow chart of a power supplying method of a voice remote controller in accordance with an embodiment of the present disclosure.

In order to make the objects, technical solutions and advantages of the present disclosure clearer, the embodiments of the present disclosure will be described below in further detail in conjunction with the drawings.

FIG. 1 is a schematic diagram of the structure of function modules of a voice remote controller in accordance with an embodiment of the present disclosure. FIG. 2 is a front view of the appearance of a voice remote controller in accordance with an embodiment of the present disclosure. As shown in FIGS. 1 and 2, the present disclosure provides a voice remote controller, comprising:

a noise gathering module 101 for gathering ambient noise at the periphery of the voice remote controller by using a sound aperture array 202;

a sound-electricity converting module 102 for converting the ambient noise gathered by the noise gathering module 101 into an electrical signal; and an energy storing module 103 for storing the electrical signal converted by the sound-electricity converting module 102 as electric energy, to supply power to the voice remote controller.

The sound aperture array 202 is provided on a main body of the voice remote controller, each sound aperture of the sound aperture array is controlled by an electrical control switch 203, and a micro-controlling module of the voice remote controller controls the turning on or turning off of the electrical control switch of each sound aperture to control the range within which the sound aperture array 202 gathers the ambient 1 noise.

Namely, the voice remote controller in accordance with the embodiment of the present disclosure, besides the functions of the conventional voice remote controllers such as a microphone (mic) sound aperture and general purpose press key region, further comprises a sound aperture array 202, each sound aperture of which is controlled by an electrical control switch 203. The overall aperture size of the sound aperture array 202 is changed by adjusting the number of sound apertures of the sound aperture array 202, thereby adjusting the structure of the vocal cavity. The sound aperture array 202 is provided therein with a noise gathering module 101 and a sound-electricity converting module 102. The sound energy of the ambient noise gathered by the noise gathering module 101 drives a cavity vibration piece of the sound-electricity converting module 102 to cause a piezo-electric film to output a current, thereby conducting sound-electricity conversion.

In a preferable embodiment, the front surface and the back surface of the voice remote controller are respectively provided with a sound aperture array 202. Such a design can effectively prevent the sound aperture array 202 from being blocked when the voice remote controller is lying with the front surface or the back surface facing upward, and avoid the failure of sound-electricity conversion. If the two sound aperture arrays 202 on the front surface and the back surface share one sound-electricity converting module 102, the efficiency will be improved, the cost will be reduced and the practicality of product will be increased.

Each sound aperture of the sound aperture array 202 is controlled by an electrical control switch 203. A micro-controlling module 106 of the voice remote controller, by controlling the turning on or turning off of the electrical control switch 203 of each sound aperture, adjusts the number of the opened sound apertures in the sound aperture array 202, and thus adjust the vocal cavity structure of the sound aperture array 202, thereby adjusting the range and efficiency of gathering ambient noise by the voice remote controller ambient.

In another preferable embodiment, the voice remote controller in accordance with the present disclosure further comprises an audio gathering module 104 and an audio processing module 105.

The audio gathering module 104 is for, when a voice function of the voice remote controller is turned on, gathering a voice signal of the user by using a microphone sound aperture 201. The audio processing module 105 is for capturing a noise waveform from the ambient noise gathered by the noise gathering module 101, and superimposing the noise waveform after its phase is inverted onto the voice signal gathered by the audio gathering module 104, to filter out the ambient noise in the voice signal.

In the present embodiment, the ambient noise gathered by the noise gathering module 101 is converted and used as energy; moreover, a useful noise waveform may be captured from the ambient noise and invertedly superimposed onto the voice signal gathered by the audio gathering module 104 to filter out the ambient noise in the voice signal and improve the sampling and transmitting of the voice signal of the user.

In still another preferable embodiment, the voice remote controller in accordance with the present disclosure further comprises:

a direct current voltage stabilizing module 107 for converting the electrical signal converted by the sound-electricity converting module 102 into a direct current signal and stabilizing its voltage;

a boosting module 108 for raising a voltage of the electrical signal outputted by the direct current voltage stabilizing module 107 into a preset voltage value; and a charging protecting module 109, provided between the boosting module 108 and the energy storing module 103, for preventing overcharging of the energy storing module 103.

In the present embodiment, the ambient noise passing through the sound aperture array is gathered by the noise gathering module 101, and converted by the sound-electricity converting module 102 into an electrical signal. The electrical signal undergoes alternating current and direct current conversion and voltage stabilizing, and then is boosted to 4.2V, and directly acts on the energy storing module 103 via a charging and discharging protection circuit to charge the energy storing module 103 of the voice remote controller of the present disclosure at any time. The charging protecting module 109 can effectively prevent overcharging, maintain the high electric quantity state of the energy storing module 103 in the energy conversion process at any time, and reduce the charging times.

In the embodiments of the present disclosure, the energy storing module 103 may use a chargeable lithium battery, or other types of chargeable batteries. The voice remote controller may communicate with a controlled device such as a television set based on infrared, Bluetooth and 2.4G wireless transmission.

FIG. 3 is a schematic diagram of angles of gathering ambient noise and voice signals of a voice remote controller in accordance with an embodiment of the present disclosure. As shown in FIG. 3, the audio gathering angle of the voice signal via the microphone sound aperture 201 is $\alpha$, and the noise gathering angle of the ambient noise via the sound aperture array 202 is $\beta$.

When the voice function of the voice remote controller is turned on, if the audio gathering angle $\alpha$ and the noise gathering angle $\beta$ have a relatively large overlapped section, the signal of audio gathering angle $\alpha$ contains a relatively large part of the signal component of noise gathering angle $\beta$. In order to reach a better noise-reduction effect, by calculating the sound pressure grades of the voice signal and the noise signal, the micro-controlling module 106 gradually adjusts the electrical control switch 203 of each sound aperture of the sound aperture array 202 to change the noise gathering angle $\beta$. When the signal component of noise gathering angle $\beta$ contained in the voice signal gathered at the audio gathering angle $\alpha$ is lower by one order of magnitude than the noise source of the noise gathering angle $\beta$, the noise gathering angle $\beta$ being adjusted is determined as the optimum noise gathering angle $\beta$. At this point, the upper side of the noise gathering angle $\beta$ is approximates parallel to the lower side of the audio gathering angle $\alpha$, and the voice signal gathering ability of the front side of the voice remote controller can be enhanced, and all audio signals other than that of the audio gathering angle $\alpha$ are absorbed as energy, so ambient sound energy is convert into electric energy and stored in the energy storing module 103 while ambient noise is reduced.

Before the noise signal gathered at the noise gathering angle $\beta$ is converted into electricity, a useful noise waveform can be captured, and the noise waveform after its phase is inverted is superimposed onto the sound source signal of the audio gathering angle $\alpha$, to more effectively filter out the ambient noise in the voice signal gathered by the microphone sound aperture.

When the voice function of the voice remote controller is turned off, the micro-controlling module 106 controls the electrical control switches 203 of all sound apertures of the sound aperture array 202 to turn on, converts all of the received audio signal to electric energy, and stores it in the energy storing module 103, and thus the energy conversion efficiency is increased, and the battery maintains a high electric quantity.

The voice remote controller in accordance with the present disclosure may be used for controlling a television set, and may also be used for controlling other electric appliances, such as computer, refrigerator and air conditioner.

FIG. 4 is a particular flow chart of a power supplying method of a voice remote controller in accordance with an embodiment of the present disclosure. As shown in FIG. 4, the power supplying method of a voice remote controller in accordance with the embodiments of the present disclosure comprises:

Step S401: gathering ambient noise at the periphery of the voice remote controller by using a sound aperture array;

Step S402: judging whether the voice function of the voice remote controller is turned on, and if the voice function of the voice remote controller is turned on, executing Step S403; if the voice function of the voice remote controller is turned off, executing Step S408;

Step S403: gathering a voice signal of the user by using a microphone sound aperture;

Step S404: controlling part of the sound apertures of the sound aperture array to close;

Step S405: capturing a noise waveform from the ambient noise gathered;

Step S406: superimposing the noise waveform after its phase is inverted onto the waveform of the voice signal to filter out the ambient noise in the voice signal;

Step S407: sending the voice signal after audio-processed to the controlled device;

Step S408: controlling all sound apertures of the sound aperture array to open;

Step S409: converting the ambient noise gathered into an electrical signal; and

Step S410: storing the electrical signal as electric energy, and supplying power to the voice remote controller.

The sound aperture array is provided on a main body of the voice remote controller, each sound aperture of the sound aperture array is controlled by an electrical control switch 203, and a micro-controlling module of the voice remote controller controls the turning on or turning off of the electrical control switch of each sound aperture to control the range within which the sound aperture array gathers the ambient noise.

The Step S404 of controlling part of the sound apertures of the sound aperture array to close when the voice function of the voice remote controller is turned on particularly comprises the steps of:

acquiring sound pressure of the ambient noise gathered by the sound aperture array and sound pressure of the ambient noise contained in the voice signal gathered by the microphone sound aperture, when the voice function of the voice remote controller is turned on; and controlling the electrical control switches of the part of the sound apertures of the sound aperture array to turn on or turn off, so that the sound pressure of an ambient noise component contained in the audio gathering angle is lower by one order of magnitude than the sound pressure of the ambient noise at the noise gathering angle.

In a preferable embodiment of the power supplying method of a voice remote controller in accordance with the present disclosure, the method further comprises the steps of:

providing a direct current voltage stabilizing module for converting the electrical signal into a direct current signal and stabilizing its voltage;

providing a boosting module for raising the voltage after stabilized to a preset voltage value; and providing a charging protecting module for preventing overcharging of a storing module of the voice remote controller.

In conclusion, compared with the prior art, the voice remote controller and a power supplying method thereof in accordance with the present disclosure have the following advantageous effects:

1. The ambient noise at the periphery of the voice remote controller is gathered by using a sound aperture array and converted into electric energy as the working energy of the voice remote controller, thereby battery replacing or frequency charging can be avoided, which is environmentally friendly, facilitates the using, and has good applicability and application compatibility.

2. By adjusting the number of opened sound apertures in the sound aperture array, the cavity and the noise gathering angle of the sound aperture array are changed to separate the ambient noise from the voice signal of the user, and the noise is converted and used as energy. Moreover, the noise after its waveform is inverted can be superimposed onto the voice signal to filter out the ambient noise in the voice signal, thereby improving the sampling and transmitting of the voice signal and reducing the negative effects of the ambient noise on the voice remote controller.

3. When the voice function of the voice remote controller is turned off, all sound apertures in the sound aperture array are opened, and all of the ambient noise gathered is converted into electric energy, which greatly improves the utilization rate of energy.

The above description is merely preferable embodiments of the present disclosure, and is not used to limit the protection scope of the present disclosure. Any modifications, equivalent substitutions or improvements that are made within the spirit and principle of the present disclosure are all included in the protection scope of the present disclosure.

What is claimed is:

1. A voice remote controller, wherein a microphone sound aperture and a sound aperture array are provided on a main body of the voice remote controller, a micro-controller and an energy storage are provided in the voice remote controller, the microphone sound aperture and the sound aperture array are connected to the micro-controller, and the energy storage is connected to the sound aperture array;

the sound aperture array gathers ambient noise at the periphery of the voice remote controller and converts the ambient noise gathered into an electrical signal;

the energy storage stores the electrical signal converted by the sound aperture array as electric energy and supplying power to the voice remote controller;

the microphone sound aperture gathers a voice signal of the user when a voice function of the voice remote controller is turned on; and the micro-controller controls the electrical control switches of all sound apertures of the sound aperture array to open when the voice function of the voice remote controller is turned off, and when the voice function of the voice remote controller is turned on, captures a noise waveform from the ambient noise gathered by the sound aperture array, superimposes the noise waveform after its phase is inverted onto the voice signal gathered by the microphone sound aperture to filter out the ambient noise in the voice signal, calculates sound pressure of the ambient noise gathered by the sound aperture array and sound pressure of the ambient noise contained in the voice signal gathered by the microphone sound aperture, and controls the electrical control switches of part of the sound apertures of the sound aperture array to close according to the sound pressure of the ambient noise gathered by the sound aperture array and the sound pressure of the ambient noise contained in the voice signal gathered by the microphone sound aperture;

wherein each sound aperture of the sound aperture array is controlled by an electrical control switch, and the micro-controller controls turning on or turning off of the electrical control switch of each sound aperture to control the range within which the sound aperture array gathers the ambient noise.

2. The voice remote controller according to claim 1, wherein when the voice function of the voice remote controller is turned on, the micro-controller enables sound pressure of an ambient noise component contained in an audio gathering angle to be lower by one order of magnitude than sound pressure of the ambient noise at the noise gathering angle by controlling the electrical control switch of each sound aperture of the sound aperture array to turn on or turn off.

3. The voice remote controller according to claim 1, further comprising therein:
   a direct current voltage stabilizer connected to the sound aperture array, for converting the electrical signal obtained by the converting by the sound-electricity converter into a direct current signal and stabilizing its voltage;
   a booster connected to the direct current voltage stabilizer, for raising a voltage of the electrical signal outputted by the direct current voltage stabilizer to a preset voltage value; and
   a charging protector which is provided between the booster and the energy storage and for preventing overcharging of the energy storage.

4. A power supplying method of a voice remote controller, comprising the steps of:
   gathering ambient noise at the periphery of the voice remote controller by using a sound aperture array;
   converting the gathered ambient noise into an electrical signal; and
   storing the electrical signal as electric energy and supplying power to the voice remote controller;
   further comprising the steps of:
   gathering a voice signal of the user by using a microphone sound aperture when a voice function of the voice remote controller is turned on;
   capturing a noise waveform from the gathered ambient noise;
   superimposing the noise waveform after its phase is inverted onto the voice signal gathered by the audio gatherer to filter out the ambient noise in the voice signal;
   calculating sound pressure of the ambient noise gathered by the sound aperture array and sound pressure of the ambient noise contained in the voice signal gathered by the microphone sound aperture;
   controlling part of the sound apertures of the sound aperture array to close according to the sound pressure of the ambient noise gathered by the sound aperture array and the sound pressure of the ambient noise contained in the voice signal gathered by the microphone sound aperture when the voice function of the voice remote controller is turned on; and
   controlling all sound apertures of the sound aperture array to open when the voice function of the voice remote controller is turned off;
   wherein the sound aperture array is provided on a main body of the voice remote controller, each sound aperture of the sound aperture array is controlled by an electrical control switch, and the range within which the sound aperture array gathers the ambient noise is controlled by controlling turning on or turning off of the electrical control switch of each sound aperture.

5. The power supplying method according to claim 4, wherein the step of controlling part of the sound apertures of the sound aperture array to close when the voice function of the voice remote controller is turned on comprises the step of:
   when the voice function of the voice remote controller is turned on, enabling sound pressure of an ambient noise component contained in an audio gathering angle to be lower by one order of magnitude than sound pressure of the ambient noise at the noise gathering angle by controlling the electrical control switch of each sound aperture of the sound aperture array to turn on or turn off.

6. The power supplying method according to claim 4, wherein the step of storing the electrical signal as electric energy and supplying power to the voice remote controller comprises the step of:
   providing a direct current voltage stabilizer for converting the electrical signal into a direct current signal and stabilizing its voltage, providing a booster for raising the voltage after the voltage stabilizing to a preset voltage value, and providing a charging protector for preventing overcharging of a storage of the voice remote controller.

7. The voice remote controller according to claim 1, wherein a front surface and a back surface of the voice remote controller are provided with the sound aperture respectively.

* * * * *